(12) United States Patent
Ohtani et al.

(10) Patent No.: US 8,011,184 B2
(45) Date of Patent: Sep. 6, 2011

(54) ELECTRIC BOOSTER AND METHOD FOR MANUFACTURING THE SAME

(75) Inventors: Yukio Ohtani, Kawasaki (JP); Takuya Obata, Minami-ALPS (JP); Takayuki Ohno, Minami-ALPS (JP); Naoki Shirakawa, Minami-ALPS (JP)

(73) Assignee: Hitachi, Ltd., Tokyo (JP)

( * ) Notice: Subject to any disclaimer, the term of this patent is extended or adjusted under 35 U.S.C. 154(b) by 635 days.

(21) Appl. No.: 12/155,391

(22) Filed: Jun. 3, 2008

(65) Prior Publication Data

US 2008/0302100 A1    Dec. 11, 2008

(30) Foreign Application Priority Data

Jun. 5, 2007    (JP) ................. 2007-149159

(51) Int. Cl.
*B60T 13/74* (2006.01)
*H02K 5/00* (2006.01)
(52) U.S. Cl. .......................... 60/545; 60/538
(58) Field of Classification Search .................. 60/538, 60/545

See application file for complete search history.

(56) References Cited

U.S. PATENT DOCUMENTS

| 4,918,921 A * | 4/1990 | Leigh-Monstevens et al. | 60/545 |
| 6,758,041 B2 * | 7/2004 | Bishop et al. ............... | 60/545 |
| 2007/0199436 A1 | 8/2007 | Ikeda et al. | |

FOREIGN PATENT DOCUMENTS

| DE | 10 2006 030168 | | 1/2007 |
| JP | 61-143253 | | 6/1986 |
| JP | 10138909 A | * | 5/1998 |
| WO | 03/091593 | | 11/2003 |

OTHER PUBLICATIONS

European Search Report (in English language) issued Sep. 25, 2008 in European Application No. 08010190.0.

* cited by examiner

*Primary Examiner* — Thomas E Lazo
(74) *Attorney, Agent, or Firm* — Wenderoth, Lind & Ponack, L.L.P.

(57) ABSTRACT

An electric booster which drives an electric motor (40) in response to a movement of an input member (9) moving together with a brake pedal (B), and generates a brake hydraulic pressure in a master cylinder (10) through a ball screw mechanism (50). The electric motor (40) includes a stator (41) having a coil therein, a rotor (42) which rotates by applying current to the stator (41), and an annular motor casing (2) containing the stator (41) and the rotor (42). The ball screw mechanism (50) is fittedly disposed in the rotor (42). An opening (3b) on one axial end side of the motor casing (2) has a larger diameter than an outer diameter of the ball screw mechanism (50). In manufacturing, after the electric motor (40) alone is tested, the ball screw mechanism (50) is inserted through the opening (3b) and installed without the need of disassembling the motor casing (2).

20 Claims, 9 Drawing Sheets

ELECTRIC BOOSTER AND METHOD FOR MANUFACTURING THE SAME

BACKGROUND OF THE INVENTION

The present invention relates to a booster for use in a brake mechanism of a vehicle. More particularly, the present invention relates to an electric booster using an electric motor as a boosting source and a method for manufacturing the electric booster.

Conventionally, many brake mechanisms of vehicles have employed a vacuum booster capable of generating output boosted relative to input by utilizing a negative pressure in an engine inlet pipe. However, recently, engine development focusing on fuel-efficient improvement, exhaust-gas cleaning and the like has been advancing, with the consequence that a negative pressure in an inlet pipe tends to be reduced. Therefore, some measures such as increasing a booster size, increasing a negative pressure with use of an ejector, and providing a vacuum pump being driven by an engine, etc need to be taken in order to obtain a desired boosting performance or response as a vacuum booster. As an inevitable result of such measures, installability of a vacuum booster onto a vehicle deteriorates, and cost of a vacuum booster becomes more expensive.

Therefore, in recent years, an electric booster using an electric motor as a boosting source has attracted attention. As such an electric booster, for example, Japanese Patent Application Public Disclosure No. SHO61-143253 discloses an electric booster in which an electric motor is driven in response to a displacement of an input member caused by a movement of a brake pedal, a piston in a master cylinder is thrust through a ball screw mechanism (rotation-linear motion converting mechanism), and a brake hydraulic pressure is generated in the master cylinder.

SUMMARY OF THE INVENTION

The electric motor disclosed in Japanese Patent Application Public Disclosure No. SHO61-143253 comprises a stator containing a coil therein, a rotor which rotates by applying current to the stator, and a box-type motor casing in which the stator and the rotor are disposed. In a case of manufacturing an electric booster, it is not possible to install the rotation-linear motion converting mechanism (ball screw) inside the electric motor after the electric motor is manufactured since the motor casing is in the shape of a box; therefore, the rotation-linear motion converting mechanism should be attached to the rotor in advance.

However, in manufacturing of this kind of electric booster, an electric motor alone, i.e., an electric motor without other components including the rotation-linear motion converting mechanism attached, should be tested as to whether a rotor of the electric motor rotates properly. In the electric motor disclosed in Japanese Patent Application Public Disclosure No. SHO61-143253, the electric motor is first manufactured without the rotation-linear motion converting mechanism and the like, and a test of the electric motor is conducted. After the test, the motor casing is disassembled, so that the rotation-linear motion converting mechanism can be installed. That is, the motor casing should be disassembled and then reassembled, leading to problems such as complication of manufacturing processes and increase in manufacturing cost.

The present invention has been made in consideration of the above-mentioned problems with conventional boosters, and an object thereof is to provide an electric booster and manufacturing method thereof in which it is possible to test an electric motor alone without the need of disassembling a motor casing, thereby facilitating manufacturing process and reducing manufacturing cost.

To achieve the forgoing and other objects, one aspect of the present invention is an electric booster, which drives an electric motor in response to a movement of an input member which moves together with a brake pedal, assists a piston of a master cylinder through a rotation-linear motion converting mechanism, and generates a brake hydraulic pressure in the master cylinder, the electric booster wherein:

the electric motor comprises a stator including a coil therein, a rotor in which the rotation-linear motion converting mechanism is fitted, and which rotates by applying a current to the stator, and an annular motor casing containing the stator and the rotor; and an opening on one axial end side of the motor casing has a larger diameter than an outer diameter of the rotation-linear motion converting mechanism.

The opening on the one end side of the motor casing may be formed on a side to which the master cylinder is connected.

The rotation-linear motion converting mechanism and the rotor of the electric motor may abut against each other in an axial direction of the rotor.

The piston of the master cylinder and the input member may be inserted through the opening on the one end side of the motor casing to be disposed in the rotation-linear motion converting mechanism.

The rotation-linear motion converting mechanism may comprise a ball screw mechanism.

The motor casing may comprise a front-side casing member to which the master cylinder is attached, and a back-side casing member which is attached to a vehicle, and the front-side and back-side casing members may be integrally coupled to each other by fastening, with the stator and the rotor axially sandwiched therebetween.

The opening on the one end side of the motor casing may be formed at the front-side casing member.

A rotation detector for detecting a rotational position of the rotor may be disposed in the motor casing.

A control board for controlling the electric motor may be mounted in the motor casing.

Another aspect of the present invention is a method for manufacturing an electric booster which drives an electric motor in response to a movement of an input member moving together with a brake pedal, assists a piston of a master cylinder through a rotation-linear motion converting mechanism, and generates a brake hydraulic pressure in the master cylinder, the method comprising:

making the electric motor by installing a stator including a coil therein, and a rotor adapted to rotate by applying a current to the stator into an annular motor casing;

forming the motor casing such that an opening on one axial end side of the motor casing has a larger diameter than an outer diameter of the rotation-linear motion converting mechanism; and installing the rotation-linear motion converting mechanism to the electric motor by inserting the rotation-linear motion converting mechanism from the opening, and fitting it into an inner surface of the rotor.

The opening on the one end side of the motor casing may be formed on a side to which the master cylinder is connected.

The rotation-linear motion converting mechanism and the rotor of the electric motor may abut against each other in an axial direction of the rotor.

The piston in the master cylinder and the input member may be inserted from the opening on the one end side of the motor casing, and may be installed in the rotation-linear motion converting mechanism.

The motor casing may comprise a front-side casing member to which the master cylinder is attached, and a back-side casing member which is attached to a vehicle, and the front-side and back-side casing members may be integrally coupled to each other by fastening, with the stator and the rotor axially sandwiched therebetween.

The opening on the one end side of the motor casing may be formed at the front-side casing member.

The method for manufacturing the electric booster may further comprise conducting a rotation test of the rotor of the electric motor after making the electric motor, and then installing the rotation-linear motion converting mechanism into the electric motor.

The method for manufacturing the electric booster may further comprise installing a rotation detector for detecting a rotational position of the rotor in the motor casing in advance of making the electric motor.

According to the electric booster as configured above and the manufacturing method thereof, since the opening on the one end side of the motor casing has a larger diameter than the outer diameter of the rotation-linear motion converting mechanism, it becomes possible to insert and install the rotation-linear motion converting mechanism from the opening of the motor casing without the need of disassembling the motor casing, after the stator and the rotor are installed into the motor casing and a test of the electric motor alone is conducted. As a result, it becomes easy and inexpensive to manufacture an electric booster.

DETAILED DESCRIPTION OF THE PREFERRED EMBODIMENT

Hereinbelow, preferred embodiments of the present invention will be described with reference to the accompanying drawings.

Figure 1:
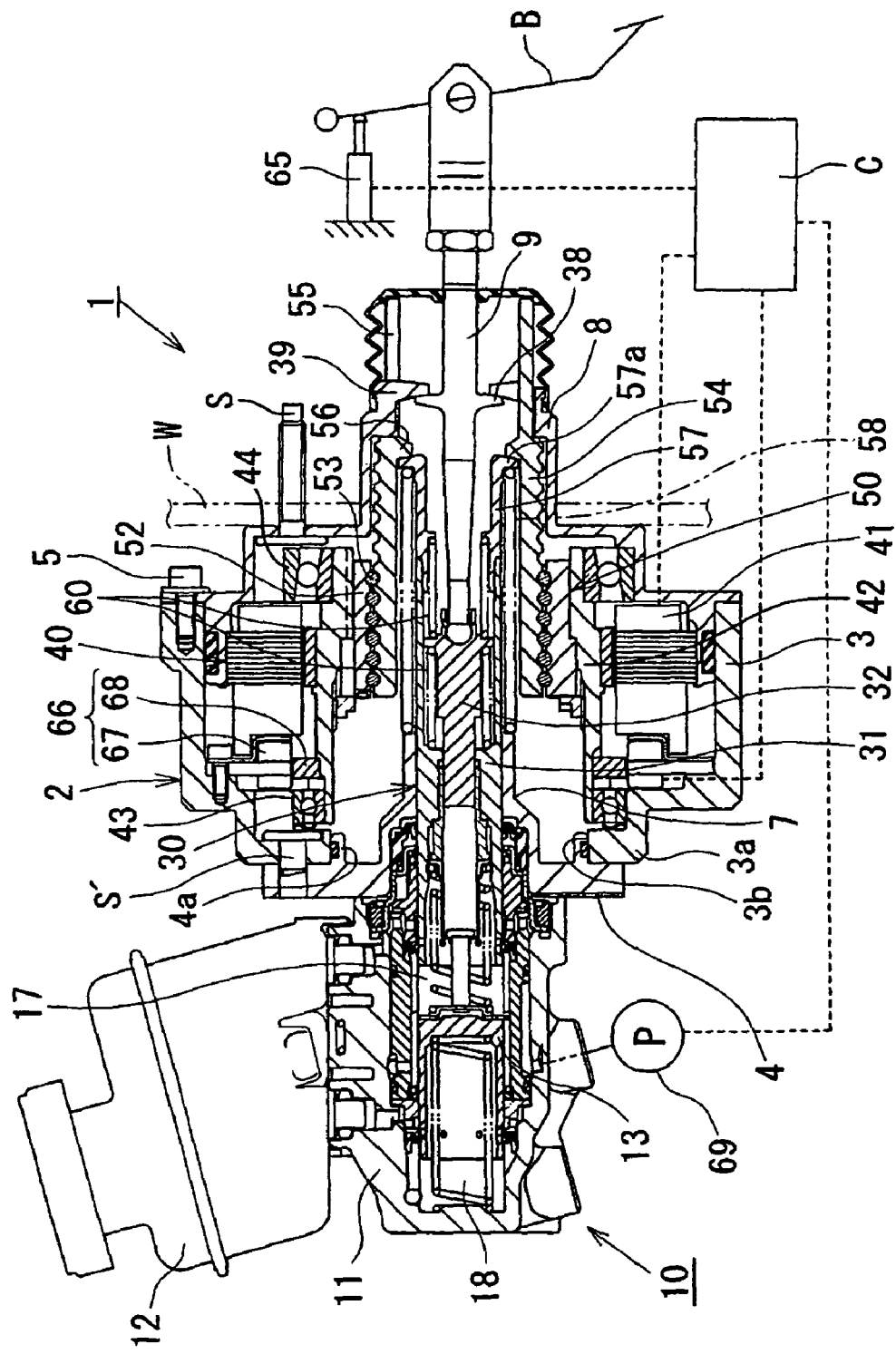
FIG. 1 is a cross-sectional view illustrating an entire structure of an electric booster of an embodiment of the present invention.
Figure 2:
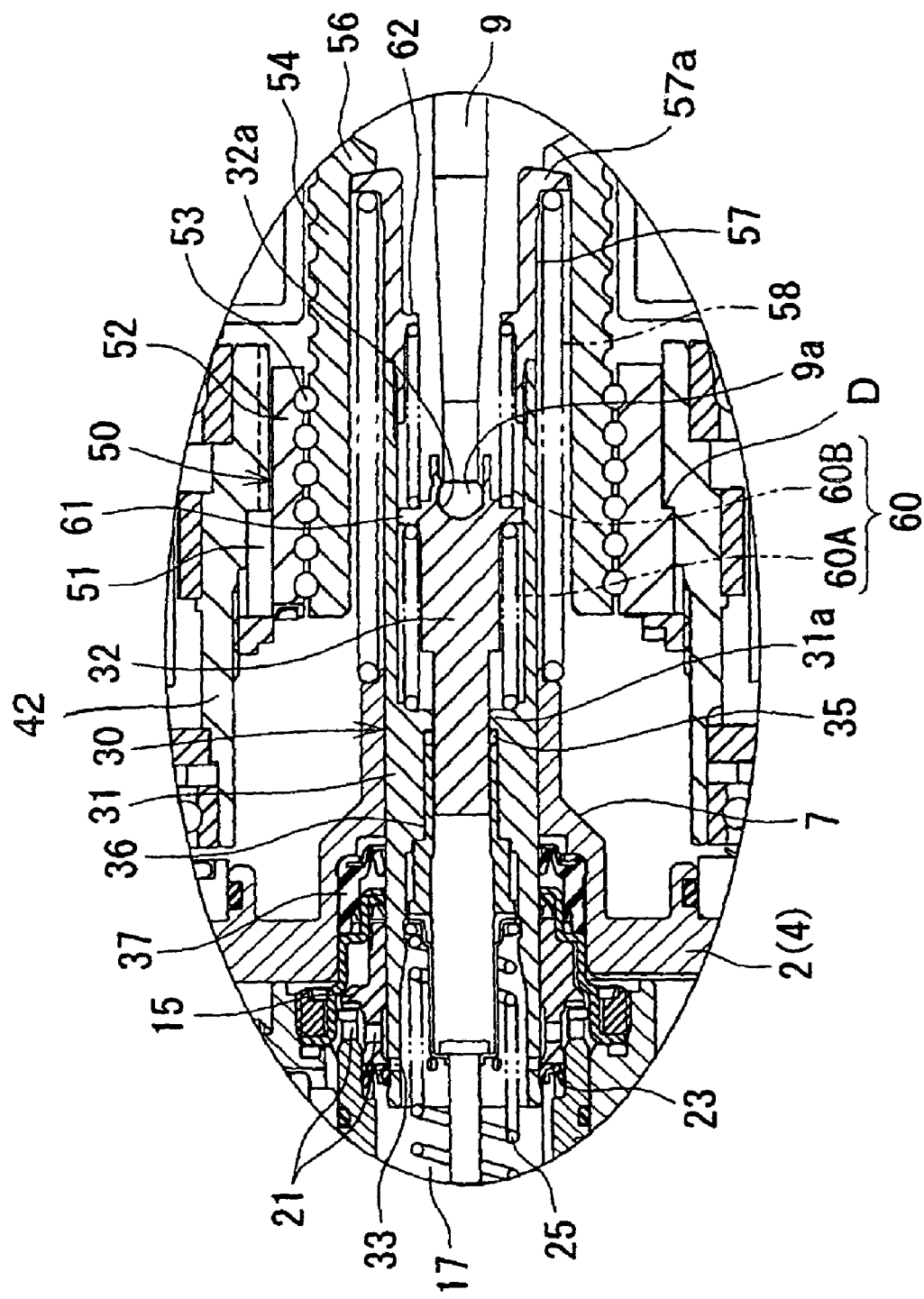
FIG. 2 is a cross-sectional view illustrating main parts of the electric booster.
Figure 3:
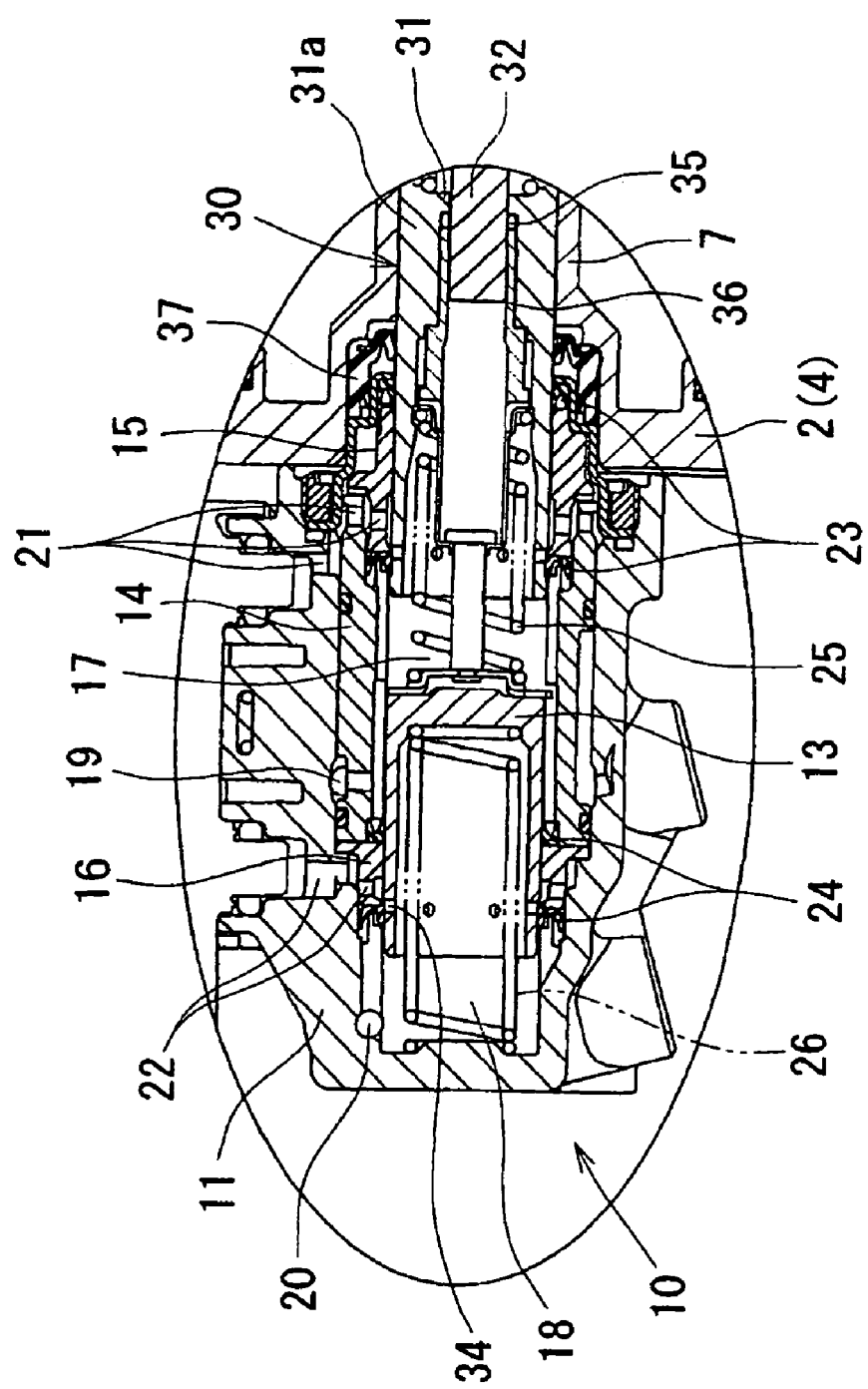
FIG. 3 is a cross-sectional view illustrating a master cylinder used with the electric booster.

FIGS. 1 to 3 illustrate one embodiment of an electric booster according to the present invention. The electric booster 1 comprises a casing (motor casing) 2 inside which a piston assembly 30 is disposed. The piston assembly 30, as will be described later, also serves as a primary piston of a tandem master cylinder 10 which will be described later. The casing 2 comprises a bottomed cylindrical casing main body (front-side casing member) 3, a front cover 4, and a cup-shaped rear cover (rear-side casing member) 6. An annular boss portion 4a of the front cover 4 is fitted in an opening (opening on one end side) 3b formed on a bottom plate 3a of the casing main body 3, whereby the front cover 4 is radially positioned. The front cover 4 is overlapped with the bottom plate 3a and fixed there by a bolt (not shown). The rear cover 6 is fitted in a rear opening of the casing 2, and is fixed to an end surface of the casing main body 3 by bolts 5. The casing 2 is fixed to a partition wall W separating an engine room from a vehicle compartment with use of a stud bolt S implanted in the rear cover 6. A master cylinder 10 is coupled to the casing 2 with use of a stud bolt S' implanted in the casing main body 3 provided integrally with the front cover 4.

The front cover 4 of the casing 2 comprises a stepped cylindrical guide portion 7 formed at a center of the front cover 4 and extending in the casing main body 3. The piston assembly 30 is fittedly inserted in the cylindrical guide portion 7. On the other hand, the rear cover 6 of the casing 2 comprises a cylindrical guide portion 8 formed at a center of the rear cover 6 and extending through the partition wall W into the vehicle compartment. An input rod (input member) 9 adapted to move together with a brake pedal B is inserted through the cylindrical guide portion 8. The above-mentioned cylindrical guide portions 7 and 8 are arranged coaxially with the master cylinder 10 and the casing main body 3.

The tandem master cylinder 10 comprises a bottomed cylinder main body 11 and a reservoir 12. As best shown in FIG. 3, a secondary piston 13, which makes a pair with the piston assembly 30 serving as the primary piston, is disposed on a bottom side of the cylinder main body 11. In the illustrated embodiment, the piston assembly 30 and the secondary piston 13 are adapted to be guided by two ring guides 15 and 16 disposed on both end sides of a sleeve 14 fitted in the cylinder main body 11. Two pressure chambers 17 and 18 are defined in the cylinder main body 11 by the piston assembly 30 and the secondary piston 13. A wall of the cylinder main body 11 are pierced to form discharge ports 19 and 20 enabling communication with wheel cylinders (not shown) associated with the respective pressure chambers 17 and 18.

Relief ports 21 and 22 are formed at the cylinder main body 11, the sleeve 14 and the ring guides 15 and 16 for enabling communication between the pressure chambers 17, 18 and the reservoir 12. A pair of seal members 23 is disposed in front of and at the back of the ring guide 15 with the relief port 21 sandwiched between the seal members 23 for providing a seal between the ring guide 15 and the piston assembly 30. A pair of seal members 24 is disposed in front of and at the back of the ring guide 16 with the relief port 22 sandwiched between the seal members 24 for providing a seal between the ring guide 16 and the secondary piston 13. The pressure chambers 17 and 18 are configured to be closed relative to the relief ports 21 and 22, when the pistons 30 and 13 move forward and the respective pairs of seal members 23 and 24 are made to slidingly contact the outer surfaces of the associated pistons 30 and 13. In addition, return springs 25 and 26 are respectively disposed in the pressure chambers 17 and 18 for biasing backward the piston assembly 30, which serves as the primary piston, and the secondary piston 13. The above-described structure of the master cylinder 1 is similar to that of a conventional general-purpose tandem master cylinder, except for the piston assembly 30 serving as the primary piston. Forward movements of the pistons 30 and 13 causes brake fluid sealingly contained in the pressure chambers 17 and 18 to be force-fed through the discharge ports 19 and 20 into the associated wheel cylinders.

As best shown in FIG. 2, the piston assembly 30 comprises a cylindrical booster piston 31, and an input piston 32 disposed in the booster piston 31 so as to be movable relative to the booster piston 31. The booster piston 31 is slidably fittedly inserted through the cylindrical guide portion 7 of the front cover 4 and the ring guide 15 in the master cylinder 10. A front end of the booster piston 31 extends into the pressure chamber (primary chamber) 17 of the master cylinder 10. On the other hand, the input piston 32 is slidably fittedly inserted through an annular wall 31a formed on an inner surface of the booster piston 31. A front end of the input piston 32 extends into the pressure chamber 17, similarly to the booster piston 31. The front ends of the booster piston 31 and the secondary piston 13 are respectively pierced to form through-holes 33 and 34 (FIG. 3) which are communicable to the relief ports 21 and 22 in the master cylinder 10. When the brake is not in operation, the pressure chambers 17 and 18 are in communication with the reservoir 12 through the through-holes 33 and 34.

A seal member 35 disposed in front of the annular wall 31a of the booster piston 31 works to seal between the booster piston 31 and the input piston 32 of the piston assembly 30. Leak of brake fluid from the pressure chamber 17 to an outside of the master cylinder 10 is prevented due to provision of the seal member 35 and the previously-mentioned seal members 23 disposed on both end sides of the ring guide 15. The seal member 35 is disposed inside the booster piston 31, and is positionally fixed by a cylindrical member 36 which receives one end of a return spring 25 in the pressure chamber 17. A seal member 37 is interposed between an inner surface of the cylindrical guide portion 7 of the front cover 4 of the casing 2 and the booster piston 31 for preventing entry of an extraneous material therebetween.

On the other hand, a front end of the input rod 9 which moves together with the brake pedal B is coupled to a rear end of the input piston 32 by a caulker, whereby the input piston 32 is adapted to move forward or backward in the booster piston 31 in response to an operation of the brake pedal B (pedal operation). Further, a flange portion 38 is integrally formed at an intermediate position of the input rod 9. The flange portion 38 abuts against an inner protrusion 39 integrally formed at a rear end of the cylindrical guide portion 8 of the rear cover 6, thereby restraining backward movement (movement toward the vehicle compartment side) of the input rod 9. In this way, return ends of the input rod 9 and the input piston 32 are defined. The input rod 9 is coupled to the input piston 32 by fitting of a spherical portion 9a formed at the front end of the input rod 9 into a spherical concave portion 32a formed at the rear end of the input piston 32 (FIG. 2), thereby allowing a swinging movement of the input rod 9.

Further, an electric motor 40 and a ball screw mechanism (rotation to linear motion converting mechanism) 50 are disposed in the casing 2 of the electric booster 1. The ball screw mechanism 50 converts rotation movement of the electric motor 40 into linear movement, which is then transmitted to the booster piston 31 of the piston assembly 30. The electric motor 40 comprises a stator 41 and a hollow rotor 42. The stator 41 is positionally-fixedly disposed between the casing main body 3 and the rear cover 6. The rotor 42 is rotatably supported by the casing main body 3 and the rear cover 6 through bearings 43 and 44.

As best shown in FIG. 2, the ball screw mechanism 50 comprises a nut member 52 and a hollow screw shaft (linear motion member) 54. The nut member 52 is non-rotatably fitted to the rotor 42 of the electric motor 40 through a key 51. The screw shaft 54 is meshed with the nut member 52 through balls 53. An axially extending slit 55 is formed at a rear end of the screw shaft 54. The inner protrusion 39 formed at a rear end of the rear cover 6 is inserted in the slit 55 (FIG. 1). In other words, the screw shaft 54 is non-rotatably and axially-movably disposed in the casing 2, whereby linear movement of the screw shaft 54 is caused when the nut member 52 rotates together with the rotor 42. On the other hand, the screw shaft 54 comprises an inner flange portion 56 formed at a start end of the slit 55. An outer flange portion 57a formed at a rear end of an extended cylindrical portion 57 of the booster piston 31 abuts against the inner flange portion 56. The opening 3b of the casing main body 3 (motor casing 2) to which the front cover 4 is attached has a larger diameter than an outer diameter of the ball screw mechanism 50, whereby it is possible to assemble the electric booster by installing the ball screw mechanism 50 into the electric motor 40 from the opening 3b. Axial movement of the nut member 52 of the ball screw mechanism 50 and the rotor 42 are restrained due to engagement of stepped surfaces D (FIG. 2) of the nut member 52 and the rotor 42.

In the illustrated embodiment, a return spring (biasing unit) 58 is interposed between the outer flange portion 57a formed at the rear end of the extended cylindrical portion 57 of the booster piston 31, and the cylindrical guide portion 7 of the front cover 4. When the brake is not in operation, the screw shaft 54 is positioned by the return spring 58 at the return end where an end surface of the inner flange portion 56 (start end of the slit 55) abuts against the inner protrusion 39 of the rear cover 6, and accordingly, the booster piston 31 is also positioned at an original position shown in FIG. 1. Therefore, when the screw spring 54 moves forward from this position, the booster piston 31 moves forward as well.

As best shown in FIG. 2, a pair of springs (biasing units) 60 (60A and 60B) are disposed between the booster piston 31 of the piston assembly 30 and the input piston 32. The spring 60A, or one of the spring pair 60 is interposed between a flange portion 61, which is formed in a protruding manner at the rear end of the input piston 32, and the annular wall 31a in the booster piston 31, while the spring 60B, or the other of the spring pair 60 is interposed between the flange portion 61 and an annular protrusion 62 formed at the extended cylindrical portion 57 provided integrally with the booster piston 31. The pair of springs 60 serves to maintain the booster piston 31 and the input piston 32 in a neutral position of relative displacement when the brake is not in operation, as will be described in detail later on.

In the illustrated embodiment, a potentiometer (displacement detector) 65 is disposed in a fixed portion in the vehicle compartment so as to be engaged with the brake pedal B. The potentiometer 65 detects absolute displacement of the input piston 32 relative to a vehicle body through the brake pedal B. A rotation sensor 66 is disposed in the casing 2. The rotation sensor 66 detects rotational displacement of the electric motor 40. The rotation sensor 66 comprises a resolver stator 67 fixed to the casing main body 3, and a resolver rotor 68 fixed to an outer surface of the rotor 42. Detection signals of the potentiometer 65 and the rotation sensor 66 are transmitted to a separately-installed controller (control unit) C. A pressure sensor 69 (FIG. 1) which detects brake hydraulic pressures of the pressure chambers 17 and 18 in the master cylinder 10 is also connected to the controller C. The controller C controls rotation of the electric motor 40 (rotor 42) based on signals transmitted from the potentiometer 65, the rotation sensor 66 and the pressure sensor 69.

Figure 4:
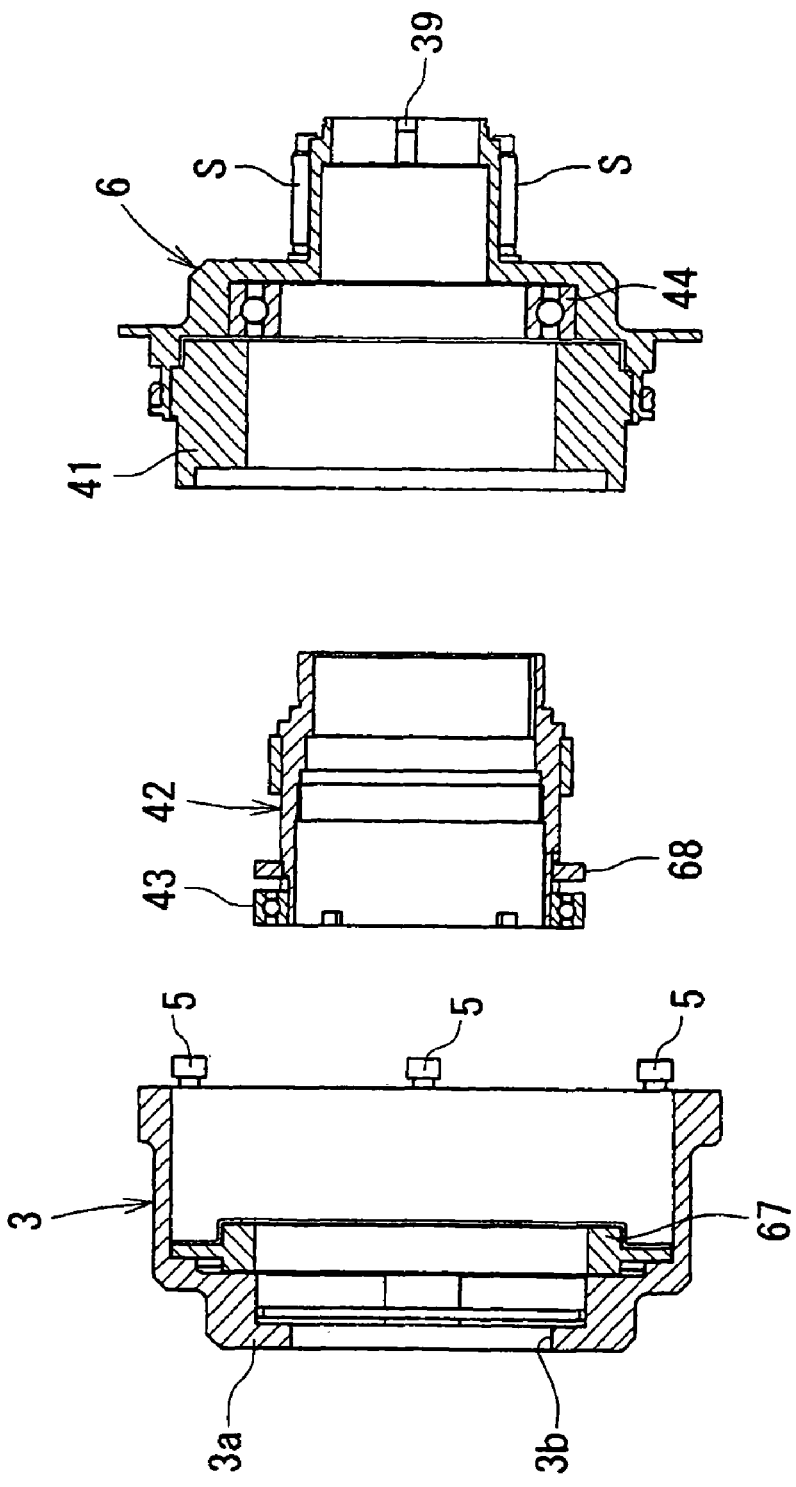
FIG. 4 is a cross-sectional view for explaining initial steps of an assembling process of the electric booster.

As shown in FIG. 4, a process for assembling the electric booster 1 starts by preparing the following three parts: the casing main body 3 to which the resolver stator 67 of the rotation sensor 66 is installed; the rear cover 6 to which the stator 41 of the electric motor 40, the bearing 44 or one of the bearings for supporting the rotor, and the stud bolt S are installed; and the rotor 42 to which the bearing 43 or the other of the bearings for supporting the rotor is installed. Then, the rotor 42 is installed in the rear cover 6, the casing main body 3 is placed over the rear cover 6, and the casing main body 3 and the rear cover 6 are fixed to each other by tightening bolts 5. By this assembling, as shown in FIGS. 5 and 6, the stator 41 and the rotor 42 are positionally fixed while being sandwiched between the casing main body 3 and the rear cover 6, and assembling of a sub assembly 70 with the electric motor 40 installed thereto is completed.

Figure 5:
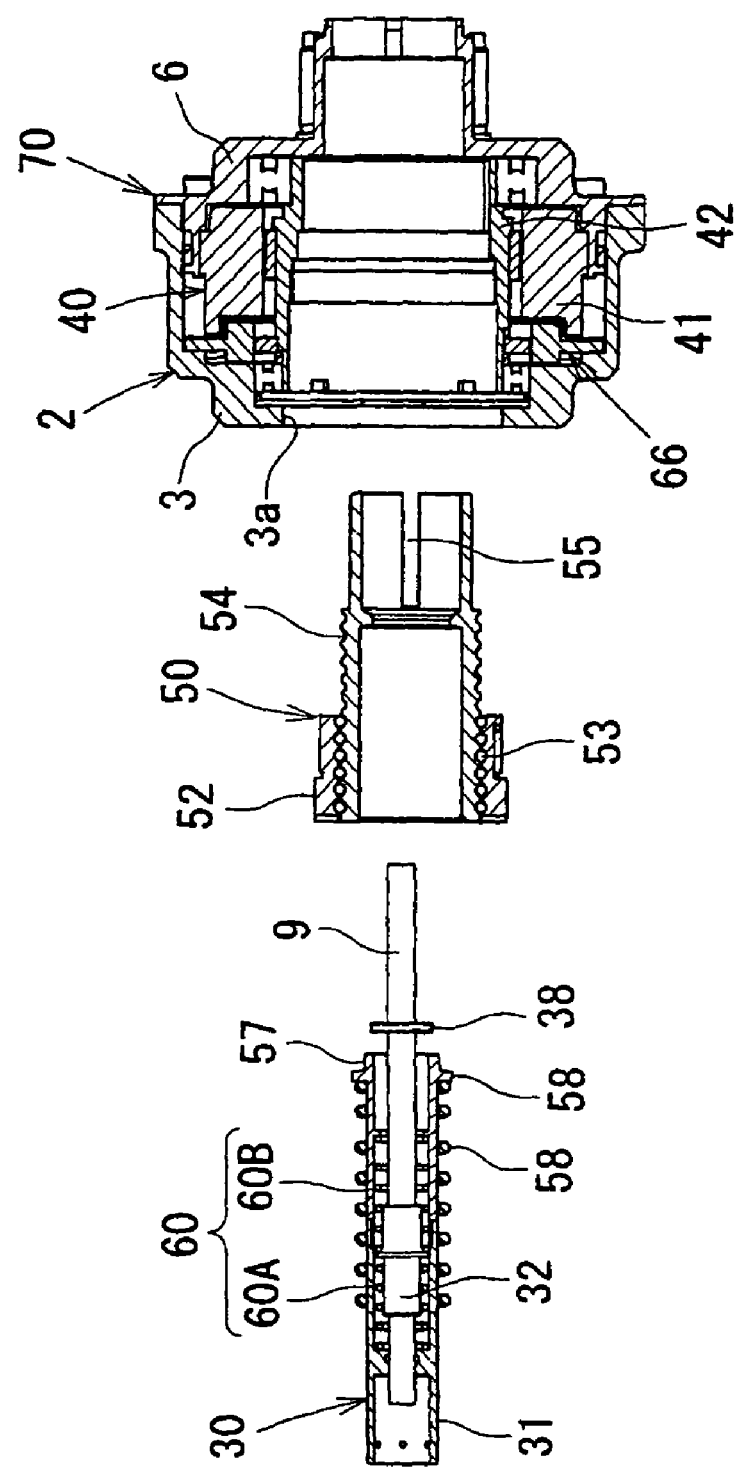
FIG. 5 is a cross-sectional view for explaining final steps of the assembling process of the electric booster.
Figure 6:
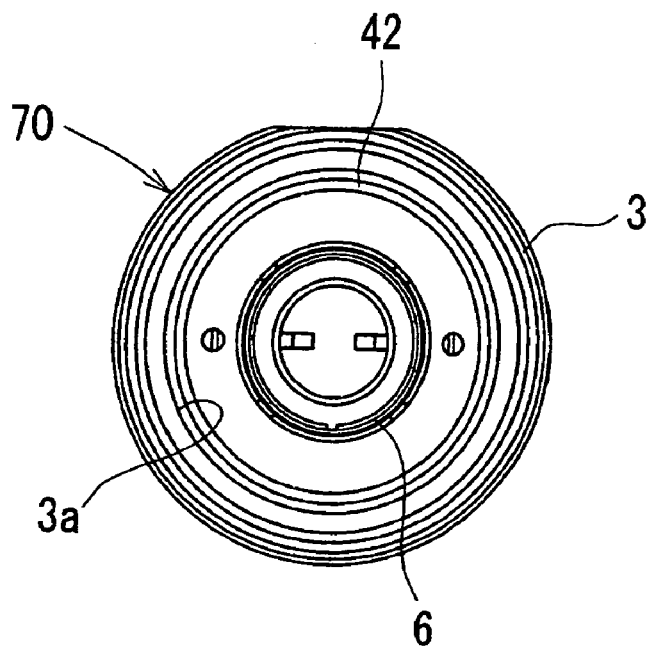
FIG. 6 is an elevational view illustrating a motor assembly of the electric booster.
Figure 7:
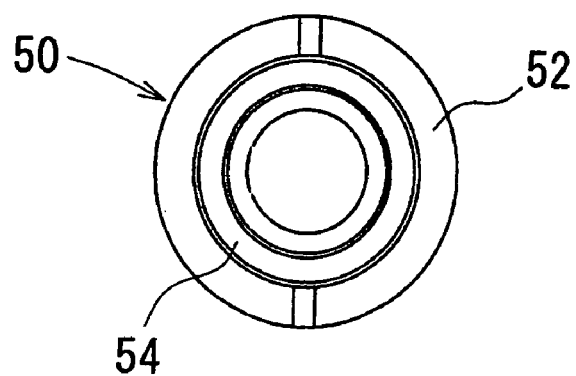
FIG. 7 is an elevational view illustrating a ball screw mechanism of the electric booster.

Next, as shown in FIG. 5, the piston assembly 30 and the ball screw mechanism 50 are prepared. The piston assembly 30 is prepared by coupling the booster piston 31 via the pair of springs 60 (60A and 60B) to the input piston 32 to which the input rod 9 is coupled in advance, and winging the return spring 58 around the outer surface of the booster piston 31. The ball screw mechanism 50 is prepared by coupling the nut member 52 to the screw shaft 54 through the balls 53. FIG. 7 is a front view of the ball screw mechanism 50. Then, the ball screw mechanism 50 is disposed in the sub assembly 70 to which the electric motor 40 is already installed, and then the piston assembly 30 is disposed therein. Finally, assembling of the electric booster 1 is completed by attaching the front cover 4 (FIG. 1) to the front of the casing main body 3 of the motor assembly 70 by bolts.

The electric motor 40 should be tested as to whether the rotor 42 thereof rotates properly. In manufacturing this electric booster, the sub assembly 70 (electric motor alone) is tested before the piston assembly 30 and the ball screw mechanism 50 are installed thereto. In this case, since the opening (opening) 3b on one end side of the casing 2 has a larger diameter than the outer diameter of the ball screw mechanism 50, it is possible to install the ball screw mechanism 50 from the one-end-side opening 3b without disassembling the casing 2 after the electric motor alone is tested. Therefore, it becomes possible to facilitate the manufacturing process and reduce manufacturing cost.

The electric booster 1 configured as described above works as follows. In response to an operation of the brake pedal B, the input piston 32 moves forward together with the input rod 9, and this forward movement is detected by the potentiometer 65. Upon receiving a signal from the potentiometer 65, the controller C outputs an actuation instruction to the electric motor 40, which causes the rotor 42 of the electric motor 40 to rotate. This rotation is transmitted to the ball screw mechanism 50. Then, the screw shaft 54 moves forward, causing the booster piston 31 to move forward as well. In other words, the input piston 32 and the booster piston 31 move forward in an integrated manner, and then brake hydraulic pressures according to an input thrust provided from the brake pedal B to the input piston 32, and a booster thrust provided from the electric motor 40 to the booster piston 31 are generated in the pressure chambers 17 and 18 in the tandem master cylinder 10.

At this time, a relative displacement amount between the input piston 32 and the booster piston 31 can be calculated from the difference between an absolute displacement amount of the input piston 32 and an absolute displacement amount of the booster piston 31 based on detection signals of the potentiometer 65 and the rotation sensor 66. If rotation of the rotor 42 of the electric motor 40 is controlled so that relative displacement does not exist between the input piston 32 and the booster piston 31, the pair of springs 60 (60A and 60B) interposed between the pistons 32 and 31 works to maintain the pistons in the neutral position. Since the relative displacement amount between the pistons is zero, the boost ratio at this time is automatically determined from an area ratio of a pressure-receiving area of the booster piston 31 to a pressure-receiving area of the input piston 32, and shows a value similar to that of a general-purpose vacuum booster.

When the booster piston 31 is displaced relative to the input piston 32 from the neutral position in a direction in which the brake hydraulic pressure is increased by the booster thrust (forward), the boost ratio is increased and it becomes possible to significantly reduce a pedal force (pedal input) since the electric motor 40 serves as a boosting source. In addition, in this case, a biasing force of the spring 60B disposed on a rear side is increased according to the relative displacement of the booster piston 31. Then, a reactive force of the brake hydraulic pressure transmitted to the input piston 32 is offset by the biasing force, whereby it becomes possible to sufficiently increase the boost ratio relative to the pedal force (input). Conversely, when the booster piston 31 is displaced relative to the input piston 32 from the neutral position in a direction in which the brake hydraulic pressure is decreased by the booster thrust (backward), a biasing force of the spring 60A disposed on a front side is increased according to the relative displacement of the booster piston 31. Then, a reactive force transmitted to the input piston 32 is increased due to the biasing force, whereby it becomes possible to reduce the boost ratio relative to the pedal force (input).

Inactivation of braking, i.e., retreat of the booster piston 31 is performed by causing the rotor 42 of the electric motor 40 to rotate in a reverse direction to cause the screw shaft 54 of the ball screw mechanism 50 to move backward. The booster piston 31 moves backward following the backward movement of the screw shaft 54, since the booster piston 31 receives a reactive force of the hydraulic pressure in the master cylinder 10 and a biasing force of the return spring 58.

Because the booster piston 31 only abuts against the screw shaft (linear motion member) 54 of the ball screw mechanism 50 via the outer flange portion 57a even when the electric motor 40 is broken (fails), the booster piston 31 is caused to move forward through the spring 60 by the input piston 32 moving forward in response to depression of the brake pedal B, whereby the input piston 32 and the booster piston 31 move forward in an integrated manner to generate a predetermined braking force. In addition, when the brake is in operation, even in failure of the electric motor 40, the booster piston 31 retreats together with the screw shaft 54 by the biasing force of the return spring 58, whereby the brake is automatically inactivated.

Especially, in the illustrated embodiment, because rotational movement of the electric motor 40 is converted by the ball screw mechanism 50 and then is transmitted to the booster piston 31, a driven force can be smoothly transmitted from the electrical motor 40 to the booster piston 31, whereby a booster thrust supply becomes stable and reliable. Further, employing the ball screw mechanism 50 makes it unlikely that a moment from the booster piston 31 acts on the electric motor 40, whereby a load applied to the electrical motor 40 is reduced. Furthermore, since the ball screw mechanism 50 is directly driven by the electric motor 40, silent and reliable operation becomes possible.

Since the illustrated embodiment includes the potentiometer 65 and the rotation sensor 66 for detecting absolute displacement of the input piston 32 and absolute displacement of the booster piston 31 relative to the vehicle body, it is possible to effectively utilize the detection results for carrying out brake assist control, regeneration control, vehicle following (ACC) control and the like according to a stroke of the input piston 32 (brake pedal B) and/or a pedal-pressing speed.

Figure 8:
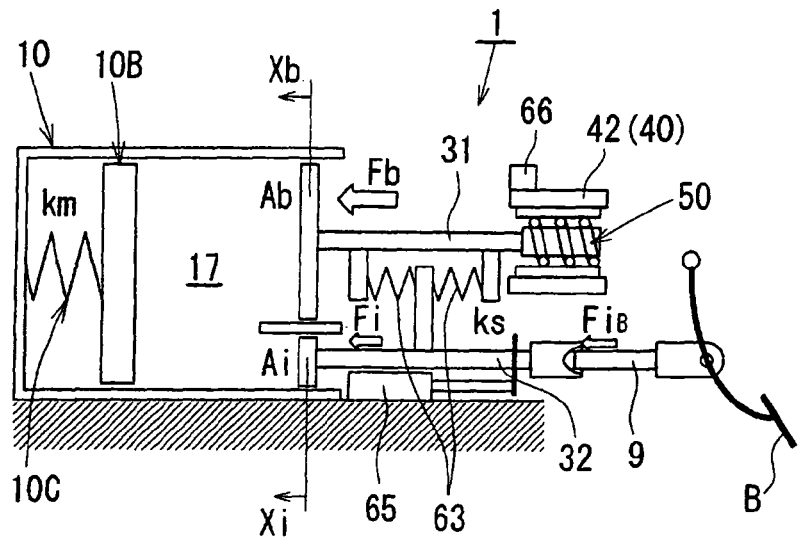
FIG. 8 is a pattern diagram illustrating a basic concept of the electric booster.

As shown in a pattern diagram of FIG. 8, the relationship between the pressure chambers 17, 18 of the master cylinder 10, and rigidity of all load-side elements including pipes connected to the pressure chambers and a disk brake (liquid amount to generated hydraulic pressure) is to be analyzed by replacing them with a displacement Xm of a piston 10B having a same cross-sectional area as the cross-sectional area (Ai+Ab) of the pressure chamber 17 of the master cylinder, and a spring constant km of a spring element 10C attached to the piston 10B. In this case, the equation (1) shown below is derived from a principle of equilibrium of force, where Xi and Xb respectively represent displacements (strokes) of the input piston 32 and the booster piston 31, Fi and Fb respectively represent a generative force (input thrust) of the input piston 32 and a generative force (booster thrust) of the booster piston 31, which are ultimately applied to the portion facing the pressure chamber 17 of the master cylinder.

$$Fi + Fb = \{(Ab \times Xb + Ai \times Xi)/(Ab + Ai)\} \times km \quad (1)$$

Here, since Fb=(Ab/Ai)×Fi, this equation (1) can be expressed as the following equation (2).

$$Fi = \{(Ab \times Xb + Ai \times Xi)/(Ab + Ai)^2\} \times km \quad (2)$$

On the other hand, if $Fi_B$ represents an input from the brake pedal B (pedal input), and ks represents a spring constant of the spring 60 interposed between the input piston 32 and the booster piston 31, $Fi_B$ can be expressed as equation (3) shown below. Therefore, equation (4) shown below is obtained from the relationship between equation (2) shown above and this equation (3).

$$Fi_B = Fi - ks \times (Xb - Xi) \quad (3)$$

$$Fi_B = \left\{ \frac{(Ab \times Xb + Ai \times Xi)}{(Ab + Ai)^2} \right\} \times Ai \times km - ks \times (Xb - Xi) \quad (4)$$

Here, in the case of Xb=Xi (no relative displacement), equation (4) is expressed as equation (5) shown below, and pedal feeling (relationship between pedal input and stroke) with a predetermined boost ratio is obtained.

$$Fi_B = \{Ai/(Ab+Ai)\} \times Xi \times km \quad (5)$$

It should be appreciated from equation (4) that, if the booster piston 31 is controlled so that relative displacement (Xb−Xi) between the input piston 32 and the booster piston 31 is provided so as to change the boost ratio, pedal feeling is changed by the load-side spring constant km and the spring constant ks of the spring 60.

Figure 9:
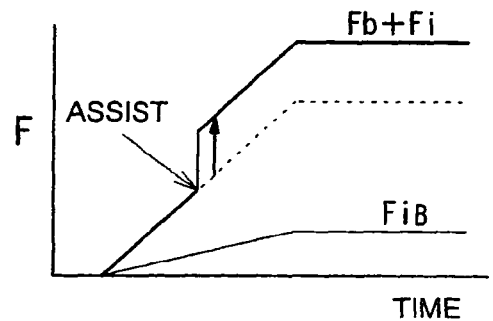
FIG. 9 is a graph showing change in input and output characteristics over time when a brake assist is actuated in the electric booster.
Figure 10:
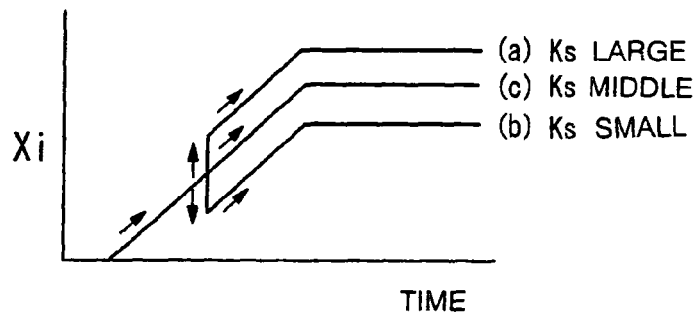
FIG. 10 is a graph showing change in pedal stroke over time when the brake assist is actuated in the electric booster.

FIG. 9 shows change in thrust F when brake assist by the electric motor 40 is actuated while the pedal input $Fi_B$ is increased at a constant speed. FIG. 10 shows change in stroke (pedal stroke) Xi of the input piston 32 at this time. The brake pedal B is displaced forward when the spring constant ks of the spring 60 interposed between the input piston 32 and the booster piston 31 shows a large value (FIG. 10(*a*)), and therefore it is possible to realize pedal feeling when a conventional brake assist is actuated. To the contrary, the brake pedal B is displaced backward when the spring constant ks shows a small value (FIG. 10(*b*)), and therefore it is possible to realize short stroke of the brake pedal B while the brake assist is actuated in emergency situations. On the other hand, the displacement of input piston 32 is gradual, and the brake pedal B is hardly affected even when the brake assist is actuated, when the spring constant ks is set to an appropriate value (FIG. 10(*c*)). In other words, even though the reactive force of the hydraulic pressure applied from the pressure chamber 17 of the master cylinder 10 to the input piston 32 is increased due to actuation of the brake assist (forward movement of the booster piston 31), the increased reactive force of the hydraulic pressure becomes approximately equal to the biasing force of the spring 60 biasing the input piston 32 forward which is generated due to the relative displacement, and the increased reactive force of the hydraulic pressure is almost completely offset by the biasing force, whereby it becomes possible to eliminate influence on the brake pedal B.

Here, the spring constant ks of the spring 60 should have a value such that equation (6) shown below is derived from equation (4) shown above, in order to eliminate influence on the brake pedal B. Such ks can be expressed as equation (7) shown below.

$$Fi_B = \{Ai/(Ab+Ai)\} \times Xi \times km \quad (6)$$

$$Ks = \{(Ab \times Ai)/(Ab+Ai)^2\} \times km \quad (7)$$

On the other hand, a brake hydraulic pressure Pm and a fluid amount Vm in the pressure chamber 17 can be respectively expressed as equations (8) and (9) shown below.

$$Pm = \{(Ab \times Xb + Ai \times Xi)/(Ab+Ai)^2\} \times km \quad (8)$$

$$Vm = Ab \times Xb + Ai \times Xi \quad (9)$$

Therefore, the relation between Pm and Vm can be expressed as equation (10) shown below, and equation (11) shown below can be derived from equation (10).

$$Pm = Vm/(Ab+Ai)^2 \times km \quad (10)$$

$$km = (Pm/Vm) \times (Ab+Ai)^2 \quad (11)$$

Equation (12) shown below is obtained by substituting equation (11) for km in equation (7).

$$ks = Ai \times Ab \times (Pm/Vm) \quad (12)$$

In sum, it is possible to determine the spring constant ks of the spring (biasing unit) 60 interposed between the input piston 32 and the booster piston 31, based on the pressure-receiving areas Ai and Ab of the input piston 32 and the booster piston 31 facing the pressure chamber 17 in the master cylinder 10, and the brake hydraulic pressure Pm and the fluid amount Vm of the master cylinder 10. The pressure-receiving areas Ai and Ab of the input piston 32 and the booster piston 31 are known, and a rate of how the brake hydraulic pressure Pm increases or decreases according to increase or decrease in the fluid amount Vm of the master cylinder is determined based on a vehicle in which the electric booster is employed. Therefore, it is possible to realize the relation of (c) shown in FIG. 10 by adjusting the spring constant ks to a set value obtained by these known parameters. That is, it becomes possible to approximately equalize the increased reactive force of hydraulic pressure applied from the master cylinder pressure chamber 17 to the input piston 32 due to an actuation of the brake assist (forward movement of the booster piston 31), and the biasing force of the spring 60 biasing the input piston 32 forward due to relative displacement between the booster piston 31 and the input piston 32. It should be noted that, Xi shows a shift of (a) shown in FIG. 10 when the spring constant ks is greater than the set value, while Xi shows a sift of (b) shown in FIG. 10 when the spring constant ks is smaller than the set value.

Figure 11:
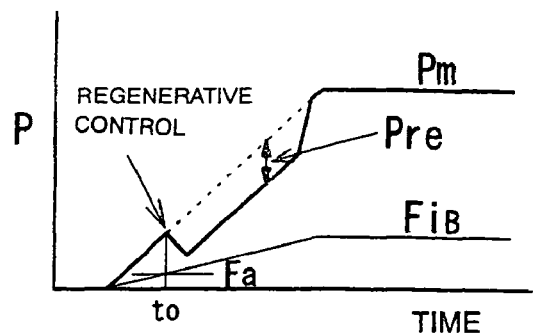
FIG. 11 is a graph showing change in pedal input and brake hydraulic pressure over time when the electric booster is used with a regenerative brake system.

When the electric booster 1 is used along with a regenerative brake system, relation between the pedal input $Fi_B$ and the brake hydraulic pressure Pm is as shown in FIG. 11. In FIG. 11, "Pre" represents a brake hydraulic pressure generated by regenerative control, and if regenerative control is actuated when the pedal input $Fi_B$ is at Fa, the electric booster 1 only has to displace the booster piston 31 backward by an amount corresponding to Pre. In this case, if the spring constant ks satisfies equation (12) shown above, although the brake hydraulic pressure Pm is reduced by an amount corresponding to Pre, the biasing force of the spring 60 approximately equal to a reduced amount corresponding to Pre acts on the input piston 32 to urge it backward. Therefore, as a whole, a reactive force corresponding to a braking force from the pedal stroke Xi is maintained on the brake pedal B (input piston 32). At this time, the pedal input $Fi_B$ is maintained as a value determined based on Xi and km by using equation (6). As a result, it is possible to increase or decrease a braking force (hydraulic pressure) generated in the master cylinder 10 without changing a reactive force applied from the master cylinder 10 to the brake pedal B (input piston 32), which is obtained by adding a hydraulic pressure and a biasing force of the spring 60.

In the illustrated embodiment, a set load is applied to the return spring 58 for biasing the booster piston 31 and the screw shaft (linear motion member) 54 of the ball screw mechanism 50 in the return direction so that a brake hydraulic pressure is not generated by the input piston (first member, shaft member) 32 until the brake hydraulic pressure reaches a pressure generating deceleration corresponding to deceleration (for example, 0.3 G) at regenerative braking described above. That is, a set load Fre is applied to the return spring 58, and the set load Fre is larger than the spring constant ks of the spring 60 multiplied by a stroke Xmax of the input piston 32 generating a brake hydraulic pressure corresponding to an upper limit of a brake hydraulic pressure at regenerative braking (Fre>ks×Xmax). By this arrangement, redundant brake hydraulic pressure is not generated at the time of regenerative braking, and therefore excellent braking feeling can be securely obtained.

Figure 12:
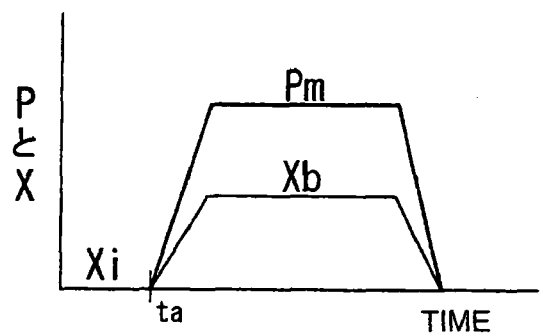
FIG. 12 is a graph showing change in displacement of a booster piston and brake hydraulic pressure over time when the electric booster is used with a vehicle-ahead following system.

When the electric booster 1 is used along with a vehicle-ahead following system (ACC), displacement Xb of the booster piston 31 and the hydraulic pressure Pm of the master cylinder have a relationship shown in FIG. 12. For the vehicle to start to slow down following a vehicle ahead at a time ta, the vehicle receives an instruction regarding required deceleration from an ECU (not shown), displaces forward the booster piston 31, and generates the brake hydraulic pressure Pm. The vehicle starts to slow down according to the generation of the brake hydraulic pressure Pm. In this case, the brake pedal B remains in a same position, because the biasing force of the spring 60 biasing the input piston 32 forward due to relative displacement between the booster piston 31 and the input piston 32, and the increased reactive force of the hydraulic pressure applied from the master cylinder pressure chamber 17 to input piston 32 become equalized and balanced (In FIG. 12, Xi lies at a position of displacement 0.) Here, since the return end of the input piston 32 is positioned such that the flange portion 38 of the input rod 9 abuts against the inner protrusion 39 of the rear cover 6, the increased reactive force of the hydraulic pressure applied to the input piston 32 may be slightly larger than the biasing force of the spring 60 biasing forward the input piston 32 by setting the spring constant ks of the spring 60 to a value slightly smaller than the set value. By this arrangement, even when the spring constant km of the master cylinder 10 is reduced due to, for example, change in a thickness of a brake pad (for example, uneven wear of a brake pad)(in this case, the spring constant ks of the spring 60 should be reduced from equation (7)), since the spring constant ks is set to a value slightly smaller than the set value by taking into consideration this factor, it is possible to realize a system in which the brake pedal B is not displaced forward.

Figure 13:
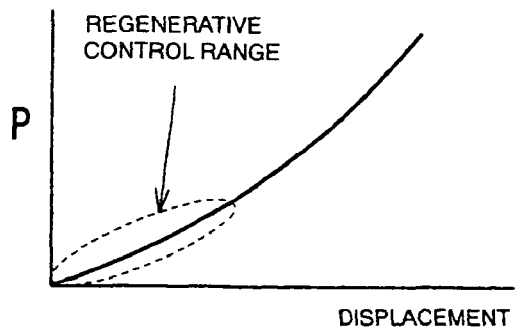
FIG. 13 is a graph showing an actual relation between displacement of the piston and hydraulic pressure in the master cylinder used with the electric booster.

Having described the embodiment assuming that the spring constant km of the master cylinder 10 has linear characteristics for sake of simplicity, in practice, the spring constant km, i.e., displacement of the piston 10B and the hydraulic pressure generated by this displacement usually may have nonlinear characteristics, as shown in FIG. 13. Therefore, preferable pedal feeling can be obtained by setting the spring constant ks of the spring 60, taking into consideration a range of regenerative braking in which pedal feeling is especially affected (for example, a hydraulic pressure range in which deceleration is equal to or less than 0.3 G). In this case, the spring constant ks of the spring 60 can be obtained based on the following equation (13) using a change rate of increase/decrease of little brake hydraulic pressure Pm along with increase/decrease of little fluid amount Vm in the above-mentioned range of regenerative braking, instead of Pm/Vm of equation (12) shown above.

$$Ks = Ai \times Ab \times (\Delta Pm/\Delta Vm) \tag{13}$$

In FIG. 13, invalid stroke of the master cylinder 10 is not taken into consideration since it is based on the pattern diagram of FIG. 8.

As described above, according to the electric booster 1 of the illustrated embodiment, braking operation performed by the electric motor 40 does not affect the brake pedal B. Therefore, excellent pedal feeling is maintained, and in application to a regenerative braking system and a vehicle-ahead following system as well as a brake assist system, reliability of the booster can be improved. In addition, since only the spring 60 having a predetermined spring constant is interposed between the input piston 32 and the booster piston 31, a simple and compact structure can be realized, whereby cost and installability onto a vehicle becomes advantageous.

Figure 14:
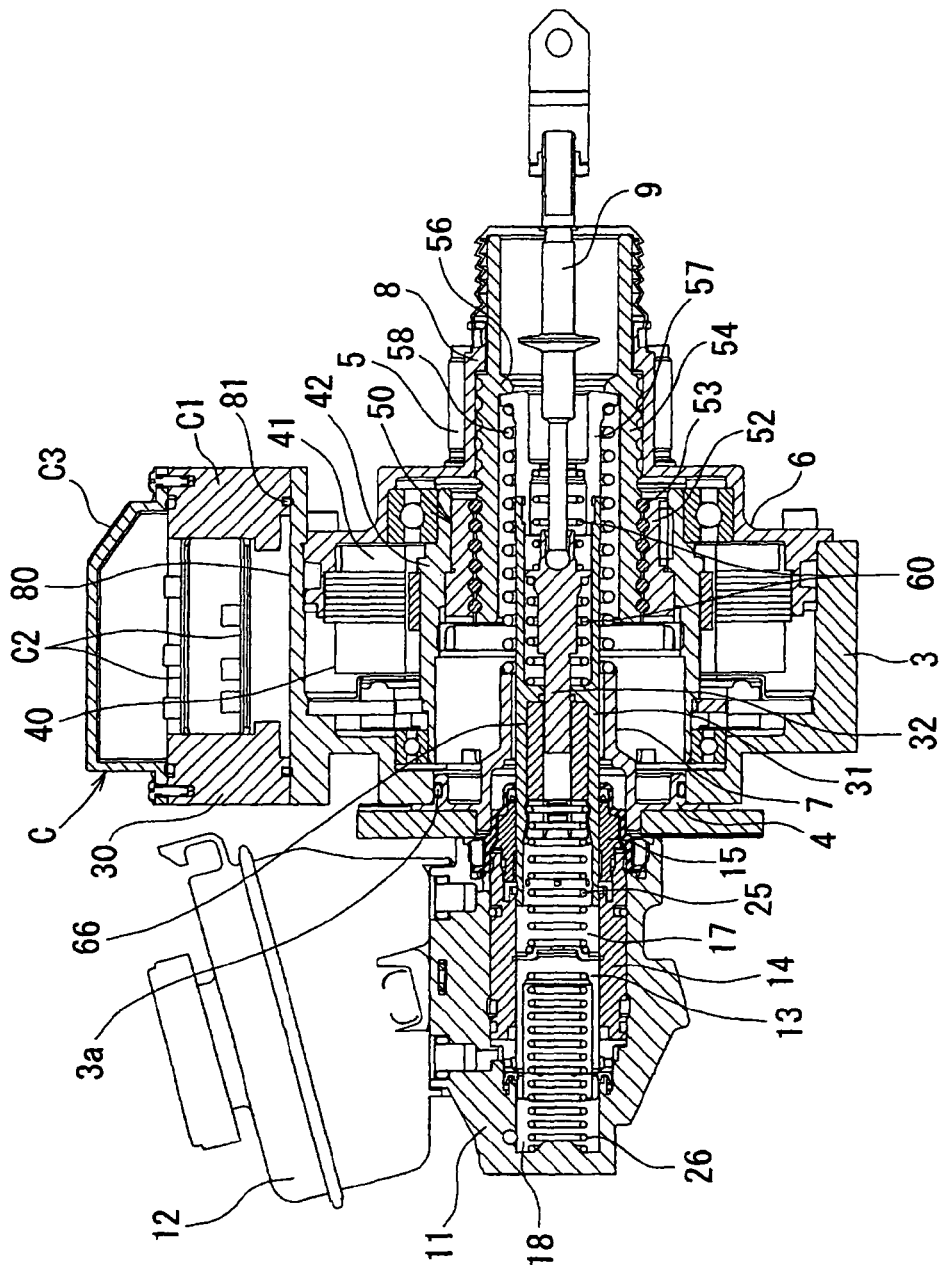
FIG. 14 is cross-sectional view illustrating an embodiment of the present invention in which a controller is provided integrally with the motor casing.

In the illustrated embodiment, the controller C for controlling the electric motor 40 is installed separately from the casing (motor casing) 2. In another embodiment, the controller C (control board) may be installed in the casing 2, as shown in FIG. 14. In this case, a flat seat portion 80 may be disposed on a part of the outer surface of the casing main body 3, and a main body C1 of the controller C may be fixedly seated on the seat portion 80 through a seal member 81. The controller C comprises two boards C2 adapted to be contained in the main body C1 in parallel with a flat surface of the seat portion 80, and a cover C3 for closing the portion where the boards C2 are contained. One of the two boards C2 serves as a power module for converting DC to AC and supplying a controlling current to a three-phase motor. The other of the two boards C2 serves as a communication control module for enabling communication to a main controller (not shown) of a vehicle and controlling the power module. A six-conductor signal wire connected to a resolver stator 67 is connected to the communication control module in the main body C1. A two-conductor communication signal wire (serial communication) for connection to the main controller extends to the outside of the main body C1. In this way, with controller C provided integrally with the casing 2, only two signal lines (power lines) for supplying DC and a two-conductor communication signal wire are disposed, and it is unnecessary to dispose three signal wires (power wires) for supplying a controlling current to the three-phase motor and a six-conductor signal wire to the resolver stator 67, which otherwise would take up much space. As a result, wiring around the casing 2 can be simplified and the installability onto a vehicle can be improved.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2007-149159, filed on Jun. 5, 2007. The entire disclosure of Japanese Patent Applications No. 2007-149159 including specification, claims, drawings and summary is incorporated herein by reference in its entirety.

The Japanese Patent Application Public Disclosure No. S61-143253 are incorporated herein by reference in its entirety.

What is claimed is:

1. An electric booster, which drives an electric motor in response to a movement of an input member moving together with a brake pedal, assists a piston of a master cylinder through a rotation-linear motion converting mechanism, and generates a brake hydraulic pressure in the master cylinder, wherein:
   the electric motor comprises a stator including a coil, a hollow rotor in which the rotation-linear motion converting mechanism is fitted, and which rotates by applying a current to the stator, and an annular motor casing containing the stator and the rotor;
   an opening on one axial end side of the motor casing is formed on a front side thereof to which the master cylinder is connected, the opening having a larger diameter than an outer diameter of the rotation-linear motion converting mechanism;
   the rotation-linear motion converting mechanism comprises a nut member fitted to the hollow rotor so as to be non-rotatable relative to the hollow rotor, and a hollow screw shaft engaged with the nut member and disposed so as to be non-rotatable relative to the motor casing while being axially movable; and
   the piston of the master cylinder is inserted through the opening on the one axial end side of the motor casing so as to be disposed in the hollow screw shaft of the rotation-linear motion converting mechanism, resulting in abutment of the piston against the screw shaft inside the hollow screw shaft, the abutment functioning to limit movement of the piston in a backward direction opposite from the master cylinder.

2. The electric booster according to claim 1, wherein the motor casing comprises a front-side casing member to which the master cylinder is attached, and a back-side casing member which is attached to a vehicle;
   the front-side and back-side casing members are integrally coupled to each other by fastening with the stator and the rotor axially sandwiched therebetween; and
   a rotation detector configured to detect a rotational position of the rotor, the rotation detector being disposed between the front-side casing and the stator.

3. The electric booster according to claim 1, wherein:
   the master cylinder includes a reservoir configured to supply brake fluid into the master cylinder; and
   a control board configured to control the electric motor, the control board being mounted on the motor casing so as to be arranged adjacent to the reservoir.

4. The electric booster according to claim 1, wherein:
   the piston includes a radially outwardly extending outer flange portion;
   the outer flange portion abuts against the screw shaft inside the hollow screw shaft, and this abutment functions to limit movement of the piston in the backward direction; and
   a forward movement of the screw shaft toward the master cylinder causes a forward movement of the piston.

5. The electric booster according to claim 1, wherein:
   the hollow screw shaft includes a radially inwardly extending inner flange portion therein;
   abutment of the piston against the inner flange portion in the hollow screw shaft functions to limit the backward movement of the piston; and
   a forward movement of the screw shaft toward the master cylinder causes a forward movement of the piston.

6. The electric booster according to claim 5, wherein:
   the piston includes an extended cylindrical portion fitted in the hollow screw shaft and provided with an outer flange portion formed thereon;
   abutment of the outer flange portion against the inner flange portion in the hollow screw shaft functions to limit the backward movement of the piston; and
   a biasing unit configured to bias the piston in the backward direction is disposed between the outer flange portion of the extended cylindrical portion and the motor casing.

7. The electric booster according to claim 1, wherein:
   the piston includes a radially outwardly extending outer flange portion; and
   a biasing means configured to bias the piston in the backward direction is disposed between the outer flange portion and the motor casing.

8. The electric booster according to claim 7, wherein:
   the motor casing includes a cover closing the opening on the one axial end side; and the biasing means configured to bias the piston in the backward direction is disposed between the cover and the outer flange portion.

9. The electric booster according to claim 7, wherein the hollow screw shaft is biased by the biasing means into abutment against the motor casing, and this abutment determines a backward position of the screw shaft.

10. The electric booster according to claim 1, wherein:
    the input member includes a flange portion having a smaller diameter than an inner diameter of the hollow screw shaft;
    the motor casing includes a protrusion extending inwardly on another axial end side thereof so as to enable the small diameter flange portion to abut against the protrusion; and
    the input member is inserted through the opening on the one axial end side of the motor casing to be disposed in the hollow screw shaft, resulting in abutment of the small diameter flange portion against the protrusion, and this abutment functions to limit a movement of the input member in the backward direction.

11. An electric booster, which drives an electric motor in response to movement of an input member moving together with a brake pedal, assists a piston of a master cylinder through a rotation-linear motion converting mechanism, and generates a brake hydraulic pressure in the master cylinder, wherein:

the electric motor comprises a stator including a coil, a hollow rotor in which the rotation-linear motion converting mechanism is fitted, and which rotates by applying a current to the stator, and an annular motor casing containing the stator and the rotor;

an opening on one axial end side of the motor casing is formed on a front side to which the master cylinder is connected, and has a larger diameter than an outer diameter of the rotation-linear motion converting mechanism;

the rotation-linear motion converting mechanism comprises a nut member fitted to the hollow rotor so as to be non-rotatable relative to the hollow rotor, and a hollow screw shaft engaged with the nut member and disposed so as to be non-rotatable relative to the motor casing while being axially movable;

the input member includes a flange portion having a smaller diameter than an inner diameter of the hollow screw shaft;

the motor casing includes a protrusion extending radially inwardly on another axial end side thereof so as to enable the small diameter flange portion to abut against the protrusion; and the input member is inserted through the opening on the one axial end side of the motor casing to be disposed in the hollow screw shaft, resulting in abutment of the small diameter flange portion against the protrusion, and this abutment functions to limit movement of the input member in a backward direction opposite from the master cylinder.

12. The electric booster according to claim 11, wherein:
the motor casing comprises a front-side casing member to which the master cylinder is attached, and a back-side casing member which is attached to a vehicle;
the back-side casing member comprises a cylindrical guide portion extending in the backward direction; and
the protrusion is integrally formed on a back end side of the cylindrical guide portion of the back-side casing member.

13. The electric booster according to claim 11, wherein:
the motor casing comprises a front-side casing member to which the master cylinder is attached, and a back-side casing member which is attached to a vehicle;
the front-side and back-side casing members are integrally coupled to each other by fastening with the stator and the rotor axially sandwiched therebetween; and
a rotation detector configured to detect a rotational position of the rotor is disposed between the front-side casing and the stator.

14. The electric booster according to claim 11, wherein:
the master cylinder includes a reservoir disposed on the master cylinder, the reservoir configured to supply brake fluid into the master cylinder; and
a control board configured to control the electric motor is mounted on the motor casing so as to be arranged adjacent to the reservoir.

15. An electric booster, which drives an electric motor in response to a movement of an input member moving together with a brake pedal, assists a piston of a master cylinder through a rotation-linear motion converting mechanism, and generates a brake hydraulic pressure in the master cylinder, wherein:

the electric motor comprises a stator including a coil, a hollow rotor in which the rotation-linear motion converting mechanism is fitted, and which rotates by applying a current to the stator, and an annular motor casing containing the stator and the rotor;

an opening on one axial end side of the motor casing is formed on a front side to which the master cylinder is connected, and has a larger diameter than an outer diameter of the rotation-linear motion converting mechanism;

the rotation-linear motion converting mechanism comprises a nut member fitted to the hollow rotor so as to be non-rotatable relative to the hollow rotor, and a screw shaft engaged with the nut member and disposed so as to be non-rotatable relative to the motor casing while being axially movable; and the screw shaft is inserted through the opening on the one axial end side of the motor casing so as to be disposed in the hollow rotor, resulting in abutment of a back end side of the screw shaft against another axial end side of the motor casing, and this abutment functions to limit a movement of the screw shaft in a backward direction opposite from the master cylinder.

16. The electric booster according to claim 15, wherein:
the motor casing comprises a front-side casing member to which the master cylinder is attached, and a back-side casing member which is attached to a vehicle;
the back-side casing member comprises a cylindrical guide portion extending in the backward direction; and
the another axial end side of the motor casing in abutment with the back end side of the screw shaft corresponds to a back end side of the cylindrical, guide portion of the back-side casing.

17. The electric booster according to claim 15, wherein:
the motor casing comprises a front-side casing member to which the master cylinder is attached, and a back-side casing member which is attached to a vehicle;
the front-side and back-side casing members are integrally coupled to each other by fastening with the stator and the rotor axially sandwiched therebetween; and
a rotation detector configured to detect a rotational position of the rotor is disposed between the front-side casing and the stator.

18. The electric booster according to claim 15, wherein a biasing unit configured to bias the screw shaft in the backward direction is disposed between the screw shaft and the motor casing.

19. The electric booster according to claim 15, wherein:
the master cylinder includes a reservoir disposed on the master cylinder, the reservoir configured to supply brake fluid into the master cylinder; and
a control board configured to control the electric motor is mounted on the motor casing so as to be arranged adjacent to the reservoir.

20. The electric booster according to claim 15, wherein:
the screw shaft is hollow;
the input member includes a flange portion having a smaller diameter than an inner diameter of the hollow screw shaft;
the motor casing includes a protrusion extending inwardly on the another axial end side thereof so as to enable the small diameter flange portion to abut against the protrusion; and
the input member is inserted through the opening on the one axial end side of the motor casing to be disposed in the hollow screw shaft, resulting in abutment of the small diameter flange portion against the protrusion, and this abutment functions to limit a movement of the input member in the backward direction.

* * * * *